July 7, 1959 WING N. TOY 2,894,215

LINEAR VOLTAGE-TO-FREQUENCY CONVERTER

Filed March 14, 1957 2 Sheets-Sheet 1

INVENTOR
W. N. TOY
BY R. B. Ardis
ATTORNEY

July 7, 1959 WING N. TOY 2,894,215

LINEAR VOLTAGE-TO-FREQUENCY CONVERTER

Filed March 14, 1957 2 Sheets-Sheet 2

INVENTOR
W. N. TOY
BY R. B. Ardis
ATTORNEY

United States Patent Office 2,894,215

Patented July 7, 1959

2,894,215

LINEAR VOLTAGE-TO-FREQUENCY CONVERTER

Wing N. Toy, Murray Hill, N.J., assignor to Bell Telephone Laboratories, Incorporated, New York, N.Y., a corporation of New York Application March 14, 1957, Serial No. 646,124

6 Claims. (Cl. 332—14)

The present invention relates to variable-frequency wave generators and more particularly to circuit arrangements for generating waves at frequencies which vary under the control of the amplitudes of external signals.

It is sometimes desirable to convert a signal which undergoes a succession of variations in instantaneous amplitude into a corresponding wave which undergoes a similar succession of frequency variations. It has been found, for example, that under some conditions data in binary form may be more conveniently transmitted over a telephone line if it is first transformed into a wave that shifts between two predetermined frequencies which represent the respective marks and spaces.

In the past, one way of converting a signal of varying amplitude into a corresponding wave of varying frequency has been through the use of free-running multivibrators. In the vacuum tube art, it is often possible to control the output frequency of a free-running multivibrator in a substantially linear manner by superimposing the incoming signal of varying amplitude upon one or more of the principal biasing voltages of the multivibrator. When the same technique is attempted in the transistor art, however, it is found that the base current which tends to flow in each transistor even when the transistor is biased for nonconduction tends to introduce nonlinearities into the control of the output frequency.

A circuit arrangement which eliminates the adverse effect these extraneous base currents tend to have on the control of the output frequency of a transistor multivibrator is disclosed in copending application Serial No. 646,127, which was filed simultaneously with the present application by J. Maurushat, Jr. In general, that circuit arrangement takes the form of a wave generator which includes a bistable transistor multivibrator and an arrangement for triggering the multivibrator back and forth between its two stable states of equilibrium from an external timing circuit which is isolated from the multivibrator except during triggering intervals. Each state of the bistable multivibrator is alternately triggered from its nonconducting or Off condition to its conducting or On condition by the timing circuit, which includes at least one capacitor the potential across which is varied from a reference level toward a level determined by the input signal and then reset to the reference level after the multivibrator has been triggered. The multivibrator is tripped as soon as the potential across the timing capacitor reaches a predetermined intermediate level between the reference level and the level toward which it is changing. Since the input signal determines the potential toward which the timing capacitor changes, it fixes the rate of change and hence the output frequency of the generator. Although the particular circuit arrangement disclosed in the Maurushat application is capable of generating pulses having repetition rates substantially linearly related to the instantaneous amplitudes of external signals, the frequency range of linearity has not been found to be completely adequate for all applications.

A principal object of the present invention is, therefore, to increase the range over which the output frequency of a multivibrator type of circuit can be varied linearly under the control of the instantaneous amplitude of one or more external signals.

Another and more particular object is to free the reference level of the external timing circuit disclosed in the above-identified Maurushat application from dependence upon the incoming signal amplitude.

Still another object is to prevent variations of transistor base potential in the bistable multivibrator disclosed in the Maurushat application from adversely affecting linearity of operation.

In accordance with a principal feature of the invention, the timing circuit in the type of wave generator disclosed in the Maurushat application is reset after each triggering of the bistable multivibrator by a transistor switch connected directly between the timing capacitor and a source of reference potential. When the transistor switch is open, the timing capacitor is isolated from the reference source and the potential across it is free to change toward the level determined by the input signal. When the transistor switch is closed, however, the timing capacitor is clamped to the reference potential. Each time the multivibrator is triggered, the timing capacitor is returned to a potential that is independent of the input signal amplitude, thus permitting a frequency range of linear operation considerably improved from that afforded by the prior art.

In accordance with another important feature of the invention, the bistable transistor multivibrator in the type of wave generator disclosed in the Maurushat application is shifted back and forth between its two stable states of equilibrium by alternately triggering each stage from its On condition to its Off condition, rather than vice versa in the manner taught by Maurushat. The base potential of the On transistor in the multivibrator is better defined than the base potential of the Off transistor. This feature of the invention thus permits greater uniformity among successive tripping points of the multivibrator and prevents base potential variations in the Off transistor from adversely affecting the linearity of the operation of the generator.

In one preferred embodiment of the invention, the bistable transistor multivibrator has a pair of input circuits and a pair of output circuits. A pair of external timing capacitors are connected to respective ones of the input circuits through a pair of normally reverse-biased diodes. In alternation, the potential across each timing capacitor is changed from a reference level toward a level determined by the amplitude of at least one external signal. As soon as the potential across each capacitor reaches a predetermined intermediate level, the associated diode becomes forward biased and triggers its stage of the multivibrator from a conducting or On condition to a nonconducting or Off condition. For resetting purposes, a pair of transistor switches, controlled by opposite ones of the multivibrator output circuits, are connected between respective ones of the timing capacitors and the reference potential source. Substantially simultaneously with the tripping of the multivibrator, the transistor switch controlled by the triggered stage closes, resetting its timing capacitor and clamping it to the reference potential. At the same time, the other transistor switch opens, isolating its timing capacitor from the reference source and permitting the potential across it to change.

Embodiments of the invention which include a bistable multivibrator and dual external timing capacitors may utilize to advantage either one or two external signals. When a single external signal is employed it is used to control the charging rate of both of the timing capacitors. When separate external signals are employed, they are applied separately to the respective timing capacitors and may be used to secure the additional advantage of permitting the duty cycle of the output pulse train of the multivibrator to be controlled independently of the circuit parameters. The duty cycle is controlled simply by changing the ratio between the external signal amplitudes. As long as the ratio is held constant, however, substantially linear control of the output frequency or pulse repetition rate of the multivibrator is maintained. The duty cycle may, of course, also be controlled by adjusting the ratio between the timing capacitor time constants.

Other objects and features of the invention will become apparent from a study of the following detailed description of a specific embodiment. In the drawings.

Figure 1:
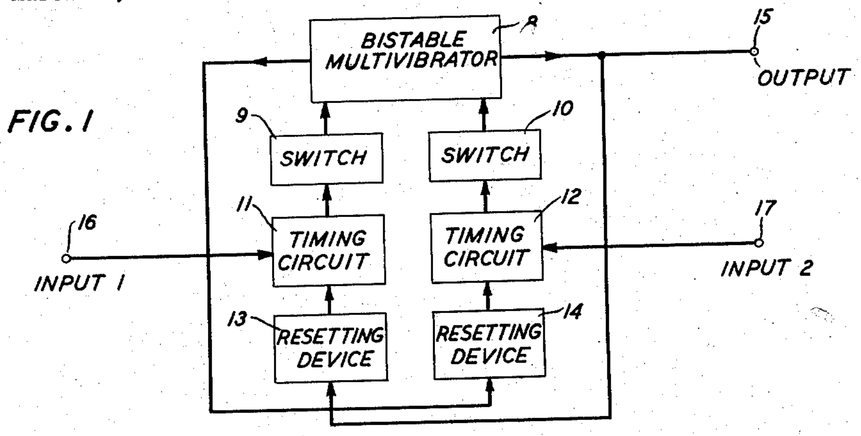
Fig. 1 illustrates the general type of circuit to which the invention relates.

Fig. 1 is a block diagram illustrating the principles underlying the type of circuit to which the present invention relates. A bistable circuit 8 has a pair of inputs connected respectively to two switches 9 and 10. Connected to the remaining terminals of respective ones of the switches 9 and 10 are the outputs of two timing circuits 11 and 12. Two resetting devices 13 and 14 are connected to timing circuits 11 and 12, respectively, in order to reset these circuits at the terminations of their timing cycles. The outputs of bistable multivibrator 8 are connected respectively to resetting devices 13 and 14 in order to activate them. A pair of input terminals 16 and 17 are provided for applying input signals of varying amplitudes to timing circuits 11 and 12, respectively, and output pulses are made available by an output terminal 15 connected to one of the outputs of multivibrator 8.

In operation, the timing circuits 11 and 12 produce output waves having amplitudes which change at a rate controlled by the instantaneous amplitudes of the input signals. When the output wave from one of the timing circuits 11 or 12 reaches a predetermined amplitude, it is applied by its associated switch 9 or 10 to bistable multivibrator 8 as a triggering signal. The multivibrator 8, when triggered, produces output pulses which are coupled to resetting devices 13 and 14 which, in turn, reset the timing circuit 11 or 12 that has just completed a timing cycle. When the resetting circuits 13 and 14 are activated by the output from the multivibrator 8, the remaining timing circuit 11 or 12 starts a similar cycle. In this manner, the timing circuits 11 and 12 alternately trigger the multivibrator 8 at intervals determined by the amplitudes of the input potentials.

Figure 2:
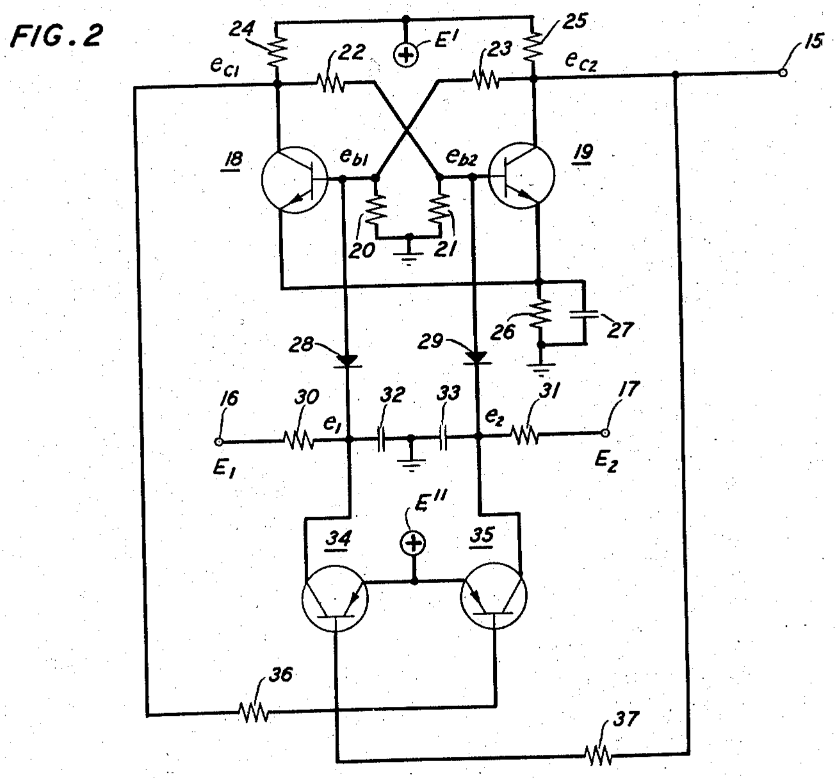
Fig. 2 shows a schematic diagram of a specific embodiment of the present invention.

Fig. 2 shows a schematic diagram of one specific embodiment of the invention. The bistable multivibrator circuit 8 comprises two NPN-type transistors 18 and 19, resistors 20 through 26, and capacitor 27. The resistor 26 and the capacitor 27 are parallel connected to form a biasing circuit. One terminal of this parallel circuit is connected to the emitter electrodes of transistors 18 and 19, while the other terminal is grounded. The resistors 20 and 21 are connected between ground and the base electrodes of transistors 18 and 19, respectively. The resistor 22 is cross-connected between the collector electrode of transistor 18 and the base electrode of transistor 19, while the resistor 23 is cross-connected between the collector electrode of transistor 19 and the base electrode of transistor 18. The resistors 24 and 25 are connected between a source of positive potential E′ and the collector electrodes of transistors 18 and 19, respectively.

A pair of diodes 28 and 29 which correspond to switches 9 and 10 of Fig. 1 are connected to the base electrodes of transistors 18 and 19, respectively, and poled so that the direction of easy current flow is away from transistors 18 and 19.

The timing circuit 11 comprises a resistor 30 and a capacitor 32 connected in series, while the timing circuit 12 comprises a resistor 31 and capacitor 33 connected in series. The junction of resistor 30 and capacitor 32 is connected to the remaining electrode of diode 28, while the junction of resistor 31 and capacitor 33 is connected to the remaining electrode of diode 29. The remaining terminals of capacitors 32 and 33 are grounded and the remaining terminals of resistors 30 and 31 are connected to signal input terminals 16 and 17, respectively.

The resetting devices 13 and 14 comprise PNP-type transistors 34 and 35, resistors 36 and 37, and a source of positive reference potential E″. The emitter electrodes of transistors 34 and 35 are connected to the source E″. The resistor 36 is connected between the base electrode of transistor 35 and the collector electrode of transistor 18, while resistor 37 is connected between the base electrode of transistor 34 and the collector electrode of transistor 19. The collector electrode of transistor 34 is connected to the junction of resistor 30 and capacitor 32, while the collector electrode of transistor 35 is connected to the junction of resistor 31 and capacitor 33.

Figure 3A:
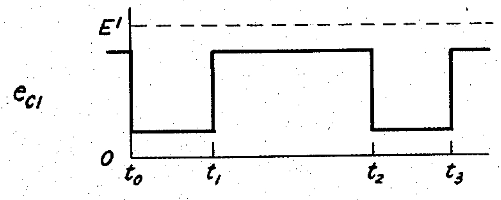
Fig. 3A through 3F illustrate waveforms appearing at various points in the diagram shown in Fig. 2.
Figure 3B:
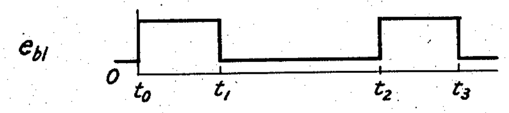
Figure 3C:
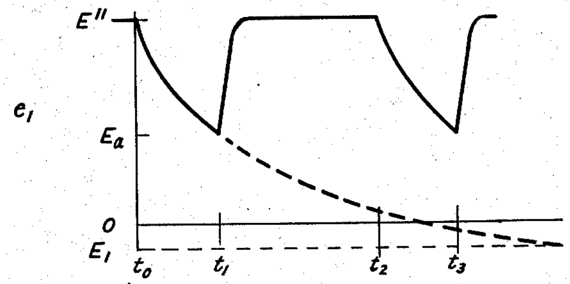
Figure 3D:
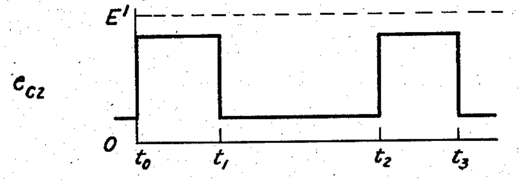
Figure 3E:
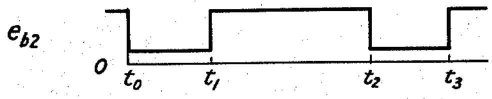
Figure 3F:
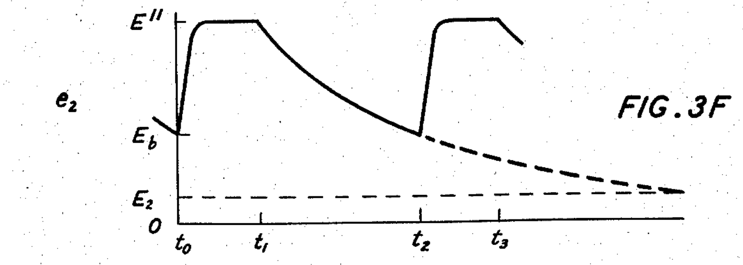

For symmetrical circuitry, the operation of the embodiment shown in Fig. 2 is illustrated by the waveforms shown in Figs. 3A through 3F. Figs. 3A and 3D show the waveforms of the collector electrode voltages $e_{c1}$ and $e_{c2}$ of transistors 18 and 19; Figs. 3B and 3E show the waveforms of the base electrode voltages $e_{b1}$ and $e_{b2}$ of transistors 18 and 19; and Figs. 3C and 3F show the waveforms of the voltages $e_1$ and $e_2$ across capacitors 32 and 33. $E_1$ and $E_2$ represent the potential levels of input signals (as illustrated, $E_1$ is negative and $E_2$ is positive) and $E_a$ and $E_b$ represent the potential levels of voltages $e_1$ and $e_2$, respectively, necessary for triggering multivibrator 8. E″ represents the reference potential level of voltages $e_1$ and $e_2$, respectively, to which timing circuits 11 and 12 are reset by transistors 34 and 35 and the source of reference potential E″.

Prior to the time $t_0$ shown in Figs. 3A through 3F, transistors 18 and 35 are in the Off state, transistors 19 and 34 are in the On state, capacitor 32 rests at the reference potential level E″ (the diode 29 being reverse biased), and capacitor 33 is discharging through resistor 30 toward the input signal-determined potential level $E_2$. When the level of the voltage $e_2$ reaches the intermediate level $E_b$ at the time $t_0$ (Fig. 3F), diode 29 is forward biased (as $E_b$ is less than $e_{b2}$) and transistor 19 switches to the Off state (Fig. 3D), which immediately switches transistor 18 to the On state because of the cross-coupling provided by resistor 23 (Fig. 3B). From this it is seen that the triggering arrangement featured by this invention causes the bistable multivibrator to change its state of equilibrium by switching its On transistor to its Off condition. Because the base potential of the On transistor in the multivibrator is better defined than the base potential of the Off transistor, greater uniformity among successive tripping points of the multivibrator is obtained. The voltage $e_{c1}$ on the collector electrode of transistor 18 (Fig. 3A) is cross-coupled to the base of transistor 19 (Fig. 3E), which maintains this transistor in the Off state. The voltage $e_{c2}$ is also coupled to the base of transistor 34 to switch it from the On state to the Off state and the voltage $e_{c1}$ is also coupled to the base of transistor 35 to switch it from the Off state to the On state. Because the polarity of the source of potential E″ is positive, the potential levels of the voltages on the collector electrodes of transistors 34 and 35 are essentially at the positive level of E″ when their respective transistors are in the On state (in the Off state they are isolated from this source of potential). When either of transistors 34 and 35 is On, the capacitor 32 or 33 of the timing circuit 11 or 12 connected to it is either charging or charged to the level E″. At time $t_0$, therefore, transistor 34 is switched Off and capacitor 32 begins to discharge through resistor 30 toward the input voltage level $E_1$. This is illustrated in Fig. 3C between times $t_0$ and $t_1$. Transistor 35 is switched On at time $t_0$ which permits capacitor 33 to accumulate a charge through transistor 35. This is illustrated in Fig. 3F between times $t_0$ and $t_1$. When the potential level of voltage $e_1$ reaches $E_a$ at the time $t_1$ ($E_a$ is less than the value of $e_{b1}$ at $t_1$), diode 28 is forward biased and transistor 18 is switched Off, which causes transistors 19 and 34 to switch On and transistor 35 to switch Off. At $t_1$ capacitor 33 begins to discharge toward the level of the input signal $E_2$ and capacitor 32 begins to charge-up toward E″. Because of the cross-coupling provided by resistors 22 and 23, each of the diodes 28 and 29 is reverse biased at all times except when the potential level of the voltage across its capacitor 32 or 33 is sufficiently low to initiate a change in the state of multivibrator 8. When this occurs the diode 28 or 29 becomes forward biased and remains so until transistor 18 or 19 in the other half of multivibrator 8 is switched On. Because diodes 28 and 29 are reverse biased at all times except during triggering intervals, timing capacitors 32 and 33 are isolated from transistors 18 and 19 so that the base currents which flow in these transistors when they are biased for nonconduction do not interfere with the charge on the capacitors.

In the foregoing discussion of the illustrated embodiment of the invention, the description of operation was predicated upon certain symmetry in the application of different signal voltages to the input terminals 16 and 17. The duty cycle of the output of multivibrator 8 is controlled simply by changing the ratio between the external signal amplitudes. As long as the ratio is held constant, substantially linear control of the output frequency or pulse repetition rate of multivibrator 8 is maintained. As has already been noted, a single input signal may be applied to both input terminals simultaneously, in which case the frequency or repetition rate of the output pulses is linearly related to the instantaneous amplitudes of this single input signal.

Although only one embodiment of the invention has been described in detail, it is to be understood that various other embodiments may be devised by those skilled in the art without departing from the spirit and scope of the invention.

What is claimed is:

1. In combination with a regenerative circuit having at least one stable state of equilibrium and timing means for triggering said regenerative circuit from said stable state of equilibrium after an interval substantially proportional to the amplitude of an external signal, means comprising a reference potential source and a transistor switch connected between said source of reference potential and said timing means for returning said timing means to its condition at the beginning of said interval substantially simultaneously with the triggering of said regenerative circuit.

2. Apparatus in accordance with claim 1 in which said regenerative circuit has at least one output and said transistor switch comprises a transistor having three electrodes, circuit means connecting said source and said timing means in series between two of said electrodes so that the potential from said source is applied in a polarity sense which tends to forward bias said two electrodes and to return said timing means to said condition at the beginning of said interval, and circuit means for connecting the remaining one of said electrodes to said output.

3. In combination with a bistable multivibrator having a pair of outputs and an input circuit comprising a pair of timing means each of which generates a triggering potential after an interval substantially proportional to the amplitude of an external signal applied thereto, a resetting means comprising a reference potential source and a pair of transistor switches connected between said source and respective ones of said pair of timing means to return said timing means to their initial conditions at the ends of their respective intervals.

4. Apparatus in accordance with claim 3 in which each of said transistor switches comprises a transistor having three electrodes, circuit means connecting said source and respective ones of said pair of timing means in series between two of said electrodes of each of said transistors so that the potential from said source is applied in a polarity sense which tends to forward bias said two electrodes of each of said transistors and to return said timing means to said initial condition, and circuit means for connecting the remaining one of said electrodes of each transistor to respective ones of said pair of outputs.

5. Apparatus for generating a wave having a repetition rate which is a function of the amplitudes of external potentials comprising a two-stage bistable transistor multivibrator, each stage of said multivibrator having an input and an output circuit and being in a conducting condition while the other is in a nonconducting condition, a pair of timing circuits each comprising a resistor and a capacitor connected in a series arrangement, means for applying said external potentials across said series arrangements, a pair of diodes respectively connected between said bistable multivibrator input circuits and said capacitors and poled to trigger their respective ones of said stages from a conducting condition to a nonconducting condition when the potentials across their respective ones of said capacitors reach predetermined levels, a source of reference potential, a pair of transistors each having base, emitter and collector electrodes, circuit means connecting said source and respective ones of said capacitors in series between two of said electrodes of each of said transistors so that the potential from said source is applied to said two electrodes in a forward biased sense and the charges placed on said capacitors by said source reverse biases their respective ones of said diodes, and circuit means respectively connecting the remaining ones of said electrodes to said output circuits.

6. Apparatus in accordance with claim 5 in which said capacitors are connected to respective ones of said collector electrodes, said reference source is connected to said emitter electrodes and said remaining ones of said electrodes comprise said base electrodes.

References Cited in the file of this patent

UNITED STATES PATENTS

| | | |
|---|---|---|
| 2,644,887 | Wolfe | July 7, 1953 |
| 2,673,936 | Harris | Mar. 30, 1954 |
| 2,724,780 | Harris | Nov. 22, 1955 |